(12) United States Patent
Sexton et al.

(10) Patent No.: US 8,950,649 B2
(45) Date of Patent: Feb. 10, 2015

(54) APPARATUS FOR BRAZING RADIAL BEARINGS AND RELATED METHODS

(71) Applicant: US Synthetic Corporation, Orem, UT (US)

(72) Inventors: Timothy N. Sexton, Genola, UT (US); John Corradini, Spanish Fork, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/827,529

(22) Filed: Mar. 14, 2013

(65) Prior Publication Data

US 2014/0263587 A1  Sep. 18, 2014

(51) Int. Cl.
*B23K 37/04* (2006.01)
*F16C 33/00* (2006.01)

(52) U.S. Cl.
CPC ...................................... *F16C 33/00* (2013.01)
USPC ....... 228/44.3; 228/44.5; 228/47.1; 228/49.1; 228/49.3

(58) Field of Classification Search
None
See application file for complete search history.

(56) References Cited

U.S. PATENT DOCUMENTS

| | | | |
|---|---|---|---|
| 2,846,968 A * | 8/1958 | Tipton | 269/201 |
| 3,056,369 A * | 10/1962 | Roth | 269/40 |
| 3,745,623 A | 7/1973 | Wentorf, Jr. et al. | |
| 3,796,422 A * | 3/1974 | Blowsky | 270/58.21 |
| 3,952,936 A * | 4/1976 | Dearman | 228/49.3 |
| 4,039,115 A * | 8/1977 | Randolph et al. | 228/44.5 |
| 4,491,307 A * | 1/1985 | Ellefson | 269/55 |
| 4,890,473 A * | 1/1990 | Westerman et al. | 72/402 |
| 5,316,202 A * | 5/1994 | Murray et al. | 228/5.5 |
| 5,431,331 A * | 7/1995 | Ney et al. | 228/212 |
| 7,060,641 B2 | 6/2006 | Qian et al. | |
| 7,398,909 B2 * | 7/2008 | Dick | 228/44.5 |
| 8,210,747 B2 | 7/2012 | Cooley et al. | |
| 2007/0256288 A1* | 11/2007 | Vermaat | 29/464 |
| 2008/0107227 A1* | 5/2008 | Koepke | 376/302 |
| 2008/0144761 A1* | 6/2008 | Jensen et al. | 376/392 |
| 2009/0206146 A1* | 8/2009 | Yamaoka et al. | 228/44.3 |
| 2010/0264134 A1 | 10/2010 | Peterson et al. | |
| 2012/0057814 A1 | 3/2012 | Dadson et al. | |
| 2012/0074205 A1* | 3/2012 | Dagenais | 228/102 |

FOREIGN PATENT DOCUMENTS

DE           4006900 A1 *   9/1991

* cited by examiner

*Primary Examiner* — Kiley Stoner
(74) *Attorney, Agent, or Firm* — Holland & Hart LLP

(57) ABSTRACT

Apparatuses and methods are provided for manufacturing bearing assemblies. In accordance with one embodiment, a fixture is provided for use in brazing bearing elements to a bearing ring. The fixture comprises a substantially annular body and at least one or more force-applying mechanism associated with the annular body. The force applying mechanisms include a push rod disposed within a channel that is formed in the annular body, the push rod being displaceable within the channel. A biasing member is configured to bias the push rod in a radial direction relative to the annular body. In one embodiment, a plurality of force-applying mechanisms are circumferentially spaced about the substantially annular body. In one embodiment, the push rods extend radially inwardly from a peripheral surface of the body, while in another embodiment the push rods extend radially outwardly from peripheral surface of the body.

21 Claims, 9 Drawing Sheets

APPARATUS FOR BRAZING RADIAL BEARINGS AND RELATED METHODS

TECHNICAL FIELD

The present invention relates to radial bearings, and more particularly to radial bearing apparatuses and methods for the manufacture of radial bearings.

BACKGROUND

Conventional bearing apparatuses include bearing surfaces that move relative to one another are known in the art. For example, radial bearings and so-called "thrust bearings" may conventionally include bearing surfaces that may at least partially contact and move or slide relative to one another or otherwise develop a fluid film between for hydrodynamic operation. Such bearing surfaces may include a superhard material for resisting wear during use of the bearing apparatus. In one example, bearing surfaces in a bearing apparatus may comprise a hard material such as diamond (e.g., polycrystalline diamond).

One application for bearing apparatuses, such as radial bearings and thrust bearings, is in association with drilling equipment utilized in subterranean drilling. Particularly, drilling motors have been utilized for drilling boreholes into subterranean formations, especially for oil or gas exploration. In a typical downhole drilling motor, the motor is suspended at the lower end of a string of drill pipe comprising a series of pipe sections connected together at joints and supported from the surface. A rotary drill bit (e.g., a fixed cutter drill bit, roller cone drill bit, a reamer, etc.) may be supported below the drilling motor (via pipe sections, drill collars, or other structural members as known in the art) or may be directly connected to the downhole motor, if desired. Drilling fluid is commonly circulated through the pipe string and the motor to generate torque within the motor, causing the rotary drill bit to rotate. The drilling fluid may then be returned to the surface through the annular space between the drilled borehole and the drill string and may carry the cuttings of the subterranean formation to the surface.

Downhole drilling motors may include bearing apparatuses, such as thrust bearings or radial bearings. In one embodiment, bearing assemblies comprised of a plurality of hard bearing elements, such as diamond bearing elements, may be coupled to the rotating bearing ring and the non-rotating bearing ring. The bearing elements are positioned adjacent one another so that the diamond bearing surfaces of the non-rotating bearing ring and rotating bearing ring may contact one another during certain operating conditions or may operate hydrodynamically under other operating conditions.

Bearing elements have traditionally been secured to bearing apparatuses through using various methods, including brazing the bearing elements to a rotating bearing ring and a non-rotating bearing ring of a bearing apparatus. However, conventional brazing techniques typically require exposing the parts to be brazed to high temperatures for extended periods of time to melt a brazing filler metal used to braze the parts. Bearing parts, such as rotating bearing rings and non-rotating bearing rings, are often placed in a heating oven for a few hours in order to heat the parts and the brazing filler metal to the appropriate brazing temperature.

During the manufacture of bearing assemblies, it can be difficult maintaining individual bearing elements in a desired position and orientation, relative to a bearing ring, while the bearing elements are affixed to the bearing ring. For example, the bearing elements may be brazed to the bearing ring, requiring the bearing assembly to be subjected to elevated temperatures. During such a high temperature process, the bearing elements may move or change their positions relative to the bearing ring, causing the bearing element to be out of an acceptable tolerance range and resulting in a bearing surface that does not match the geometric design of the bearing assembly.

It is a desire within the industry to continually improve bearing assemblies, bearing components, and the processes associated with manufacturing such components and assemblies.

BRIEF SUMMARY OF THE INVENTION

In accordance with the present invention, apparatuses and methods are provided for manufacturing bearing assemblies. In accordance with one embodiment, a fixture is provided for use in brazing bearing elements to a bearing ring. The fixture comprises a substantially annular body and at least one force-applying mechanism associated with the annular body. The at least one force applying mechanism includes a push rod disposed within a channel formed in the annular body and is displaceable within the channel. The push rod is configured to apply a force to an external component in a radial direction relative to the annular body. In one embodiment, a biasing member is configured to bias the push rod in the radial direction relative to the annular body. The at least one force-applying mechanism may include a plurality of force applying mechanisms circumferentially spaced about the substantially annular body.

In one embodiment, the push rod of the force-applying mechanism is selectively positionable in an extended state and a retracted state. The force applying mechanism may further include a handle coupled with the push rod which may be used in selectively positioning the push rod. In one embodiment, the substantially annular body includes an opening that is in communication with channel, wherein the handle extends through the opening. Such an opening may be configured as substantially L-shaped having a first leg and a second leg. The handle may be selectively positionable within the first leg and the second leg such that the push rod is in a retracted state when the handle is positioned within the second leg.

In one embodiment, the biasing member includes a coiled spring disposed within the channel. An abutment member may be coupled with the body and configured to provide an abutment surface for the coiled spring. For example, the abutment member may include a pin extending at least partially across the channel.

In one particular embodiment, the push rod extends from a radially inner peripheral surface of the annular body when in the deployed state. In another embodiment, the push rod extends from a radially outer peripheral surface of the annular body when in the deployed state.

In accordance with another aspect of the invention, a method of brazing a plurality of bearing elements to a bearing ring is provided. The method comprises providing a bearing assembly, the bearing assembly including a bearing ring and a plurality of bearing elements each being positioned within an associated pocket, of a plurality of pockets, formed in the bearing ring. The bearing assembly is positioned adjacent a fixture, the fixture comprising a substantially annular bearing ring and a plurality of circumferentially spaced force-applying mechanisms. A force is applied to each of the plurality of bearing elements with a push rod of an associated force-applying mechanism and the bearing elements are brazed to the bearing ring while the applied force to each of the bearing elements is maintained by the associated push rod.

In one embodiment, application of a force to each of the plurality of bearing elements with a push rod includes selectively positioning each push rod from a retracted state to a deployed state relative to the fixture body.

The method may further comprise removing the bearing assembly from the fixture subsequent the brazing, wherein removing the bearing assembly includes selectively positioning at least some of the push rods of the force applying mechanisms from a deployed state to a retracted state.

In one embodiment, selectively positioning at least some of the push rods of the force applying mechanisms from a deployed state to a retracted state may further include maintaining the at least some push rods in the retracted state against a biasing force without operator assistance.

Features, aspects and acts of any of the various embodiments described herein may be combined, without limitation, with other described embodiments.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
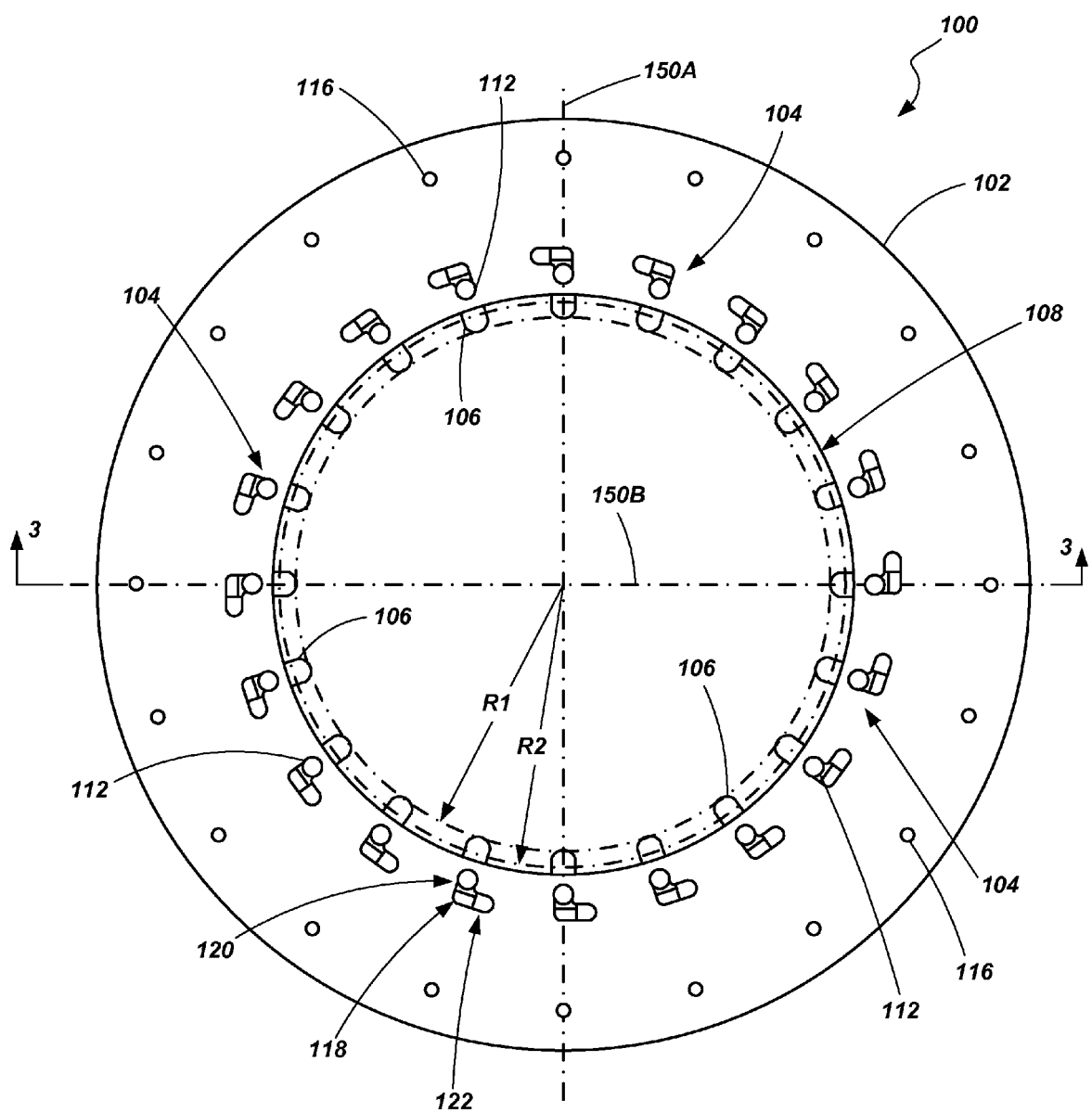
FIG. 1 is a top view of an apparatus according to at least one embodiment of the present invention in a first state.

The present invention relates generally to apparatuses and methods for brazing bearing components such as bearing rings that include bearing elements comprising superhard materials. "Superhard," as used herein, refers to any material having a hardness that is at least equal to or exceeds a hardness of tungsten carbide (e.g., without limitation, polycrystalline diamond, boron nitride, silicon carbide, and mixtures of the foregoing). For example, in one embodiment, a polycrystalline diamond compact (PDC), or multiple PDCs, may be used to form a bearing surface in the bearing elements and apparatuses of the presently disclosed invention. In another embodiment, polycrystalline diamond may include nanodiamond (i.e., ultra-dispersed diamond), if desired. In yet another example, the bearing surface may include a silicon carbide and diamond composite material such as is disclosed in U.S. Pat. No. 7,060,641, the disclosure of which is incorporated herein, in its entirety, by this reference. A variety of other superhard materials may be utilized in forming a superhard bearing in accordance with the presently disclosed invention as will be appreciated by those of ordinary skill in the art.

Considering the example of a PDC, a PDC is conventionally fabricated by placing a cemented carbide substrate into a container or cartridge with a layer of diamond crystals or grains positioned adjacent one surface of a substrate. Cartridges may be loaded into an ultra-high pressure press where the substrates and adjacent diamond crystal layers are then sintered under ultra-high temperature and ultra-high pressure ("HPHT") conditions. The ultra-high pressure and ultra-high temperature conditions cause the diamond crystals or grains to bond to one another to form polycrystalline diamond with diamond-to-diamond bonds. Additionally, as known in the art, a catalyst may be employed for facilitating formation of polycrystalline diamond. In one example, a so-called "solvent catalyst" may be employed for facilitating the formation of polycrystalline diamond. For example, cobalt, nickel, and iron are some non-limiting examples of solvent catalysts that may be used in forming polycrystalline diamond.

In one configuration, during sintering, the solvent catalyst may include the substrate body (e.g., cobalt from a cobalt-cemented tungsten carbide substrate). In such a case, the solvent catalyst from the substrate becomes liquid and sweeps from the region adjacent to the diamond powder and into the diamond grains. In another embodiment, a solvent catalyst may be mixed with the diamond powder prior to sintering, either in lieu of, or in addition to, the existence of a solvent catalyst in the substrate. Thus, diamond grains become mutually bonded to form a polycrystalline diamond table upon the substrate. A conventional process for forming polycrystalline diamond structures is disclosed in U.S. Pat. No. 3,745,623 to Wentorf, Jr. et al., the disclosure of which is incorporated, in its entirety, by this reference.

The solvent catalyst may remain in the polycrystalline diamond layer within the interstitial pores between the diamond grains or may be at least partially removed to a desired depth, such as by leaching (e.g., exposing at least a portion of the diamond table to an acid) or by any other suitable method. Removal of the catalyst may enhance the thermal stability of the PDC material. Optionally, another material may replace the solvent catalyst that has been at least partially removed from the polycrystalline diamond.

In one embodiment, a bearing apparatus may include a bearing ring having one or more polycrystalline diamond inserts or compacts defining one or more surfaces configured to move relative to some other surface. Such bearing apparatuses may encompass so-called thrust bearings, radial bearings, or other bearing apparatuses having bearing surfaces that move in relation to one another, without limitation. Examples of bearing assemblies and bearing elements are described in U.S. Pat. No. 8,210,747 to Cooley et al. and U.S. patent application Ser. No. 13/294,048, filed on Nov. 10, 2011, the disclosures of which are incorporated by reference herein in their entireties.

During the manufacture of a bearing assembly, bearing elements are often disposed in the pockets of a bearing ring. In many embodiments, it is conventional to affix the bearing elements within their respective pockets through a brazing process. The brazing of the bearing elements to the bearing ring takes place at an elevated temperature. For example, an inductive heating system may be used to heat the bearing ring and the bearing inserts to appropriate brazing temperature. One example of an inductive heating system is described in pending U.S. patent application Ser. No. 12/425,304 filed on Apr. 16, 2009, entitled APPARATUSES AND METHODS FOR INDUCTION HEATING, the disclosure of which is incorporated by reference herein in its entirety.

Figure 2:
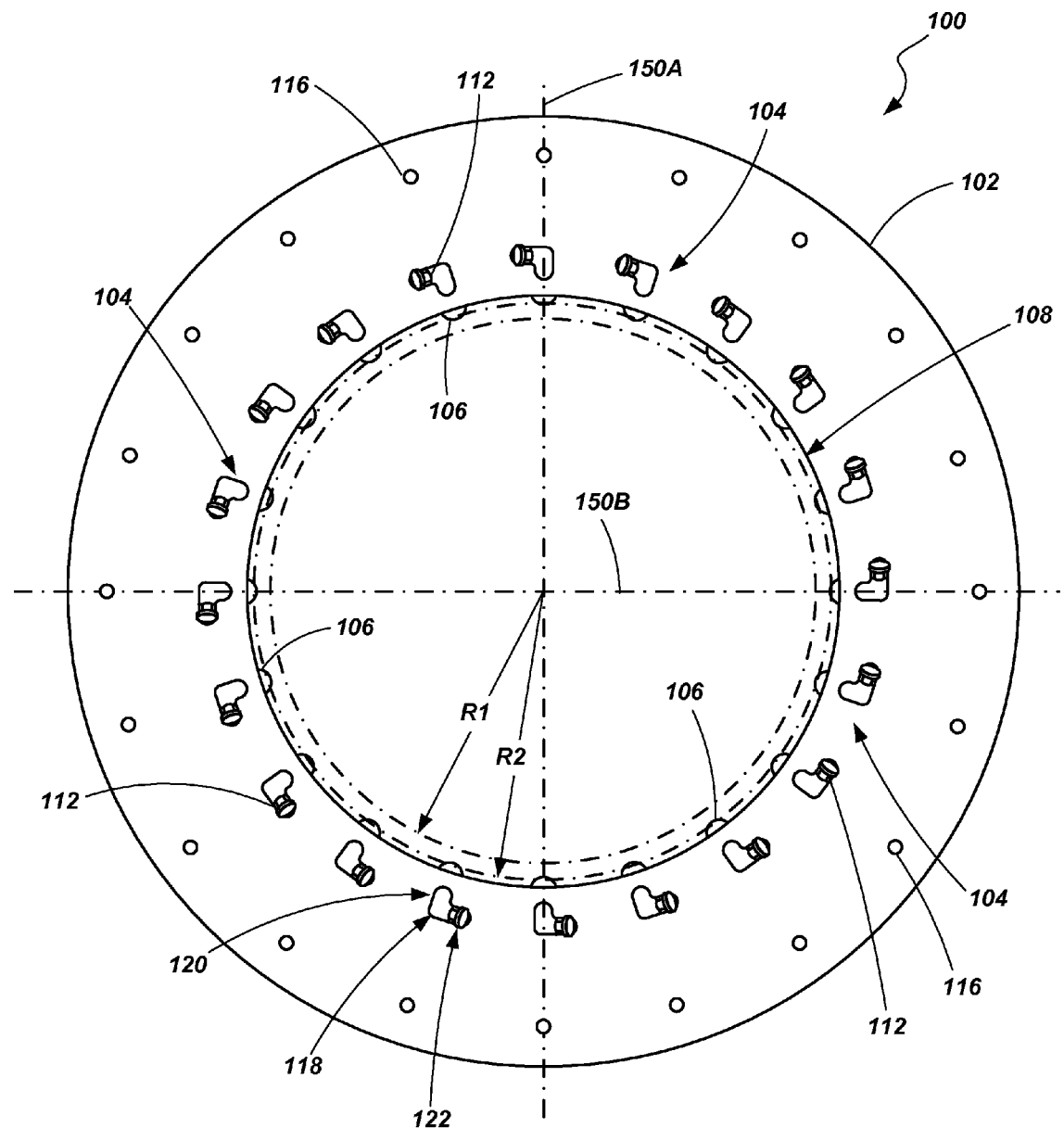
FIG. 2 is a top view of the apparatus shown in FIG. 1 while in a second state.
Figure 3:
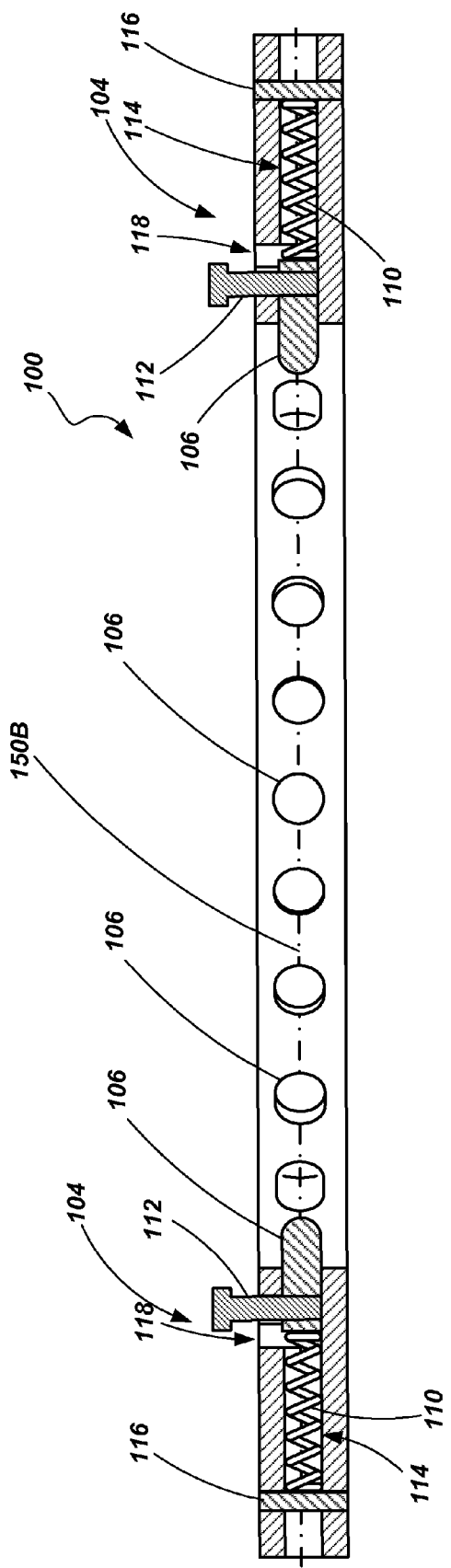
FIG. 3 is a cross-sectional side view of a portion of the apparatus shown in FIG. 1.

Referring to FIGS. 1-3, a fixture 100 is shown according to an embodiment of the present invention. The fixture 100 includes a body 102 which, in this particular embodiment, exhibits a substantially annular geometry. The fixture 100 includes a plurality of force applying mechanisms, referred to herein as pusher mechanisms 104, that are circumferentially spaced about the annular body 102. As will be discussed in more detail below, each pusher mechanism 104 is configured to selectively engage and push against, or provide a holding force for, a bearing element associated with a bearing ring. In the embodiment shown in FIGS. 1-3, the pusher mechanisms 104 each include a push rod 106 that extends radially inwardly from a radially inner peripheral surface 108 of the annular body 102.

FIG. 1 shows each push rod 106 placed in an extended state, or a state for engagement with a corresponding bearing element. In the presently described embodiment, when the push rods 106 are in an extended state, the pushrods 106 extend radially inwardly to a first radius R1 that corresponds with a radius that is somewhat smaller than the bearing surface defined by bearing elements of a bearing assembly. On the other hand, FIG. 2 shows the pushrods 106 in a relatively retracted state. When in the retracted state, the pushrods 106 may still extend radially inwardly from the inner radial periphery 108 of the annular body 102, but they only extend up to a second radius R2, wherein R2 is greater than R1 when measured from the center point of the fixture 100 (see the intersection of axes 150A and 150B in FIGS. 1 and 2). In other words, when in an extended state, the end surfaces of the push rods 106 are able to be positioned further away from an associated surface (e.g., the inner radial periphery 108) of the annular body 102 than when in a retracted state.

In another embodiment, when the push rods 106 are in a retracted state, the radially innermost ends of the push rods may be retracted within the annular body 102 such that they do not protrude, radially inwardly, beyond the radially inner peripheral surface 108 of the body 102.

In addition to the push rod 106, the pusher mechanism 104 includes a biasing member 110 (e.g., a spring, such as a coil spring) and an actuator handle 112 coupled with the push rod 106. The push rod 106 and biasing member 110 may be positioned in a generally radially extending channel 114 formed in the annular body 102 as may be seen in FIG. 3. A pin 116 may be positioned in the annular body 102 such that it traverses the channel 114 and acts as a bracing or abutting member for the biasing member 110, keeping the radially outermost portion of the biasing member 110 at a desired location. The handle 112 extends from the push rod 106 through an opening 118 formed in the annular body 102 that is in communication with the channel 114. In one embodiment, the opening 118 may be substantially L-shaped and configured so that the handle 112 may be displaced along at least two different axes. For example, the handle 112 (along with the push rod 106) may be displaced in a substantially radially direction along an axis that extends coincident with the length of a first leg 120 of the opening 118. It is noted that the first leg 120 extends in substantially the same direction as the channel 114. Displacement in this direction coincides with the displacement of the push rod 106 from an extended state to a retracted state (or vice versa) as discussed above.

The handle 112 may also be displaced in a second direction within a second leg 122 of the opening 118 (e.g., a generally circumferential direction), the second direction being at an angle (e.g., generally perpendicular) relative to the first direction. Displacement of the handle 112 in the second direction may include rotation of the push rod 106 about its longitudinal axis. When the handle 112 is displaced such that it is positioned within the second leg 122 of the opening 118, it holds the push rod 106 in a retracted position against the biasing force of the biasing member 110 or other force applying member. This enables a user to maintain the push rod 106 in a retracted position while positioning a bearing assembly relative to the fixture 100. The user may then place each push rod 106 into abutting engagement with an associated bearing element by displacing the handle 112 from the second leg 122 back into the first leg 120 so that the biasing member 110 displaces the push rod 106 through the channel toward the extended position.

The fixture 100 may be made using various materials and manufacturing processes. For example, the annular body 102 may be formed from steel, stainless steel, or some other metal or metal alloy. Likewise, the pushrods 106 may be formed of steel, stainless steel or some other metal or alloy or a ceramic material. The biasing member 110 may be formed, for example, as a metal coil spring although other biasing members may be utilized. The handle 112 may be formed of a metal or metal alloy and, in one particular embodiment, may comprise a threaded fastener, such as a cap bolt that is threadedly coupled to the push rod 106. In other embodiments, the handle 112 may be welded, brazed or coupled with the push rod 106 by other appropriate means. The various materials used to manufacture the fixture 100 optionally exhibit high-strength properties and are able to withstand relatively high temperatures, as they may be utilized in a high temperature environment during the brazing of bearing elements to a bearing ring.

Additionally, it is contemplated that the various components of the fixture 100, including the body 102 and the pusher mechanisms, may take a different form than those specifically shown in the drawings or used in the specific examples. For example, rather than using a spring or an elastic material for the biasing member, an actuating mechanism may be used. Some non-limiting examples of an actuating mechanism include hydraulic and pneumatic pistons, a solenoid, a screw jack or some other linear actuator. In such a case, the actuators may be self retracting or, optionally, a spring may be used to help retract the push rod to its retracted state.

In one embodiment, the fixture 100 may be utilized in connection with an induction heating process used to braze bearing elements to a bearing ring such as, for example, one of the induction heating processes (along with the associated heating apparatuses) that are described in U.S. patent application Ser. No. 12/425,304, previously incorporated by reference. Of course, the fixture 100 may be used in other manufacturing processes and in association with other heating apparatuses as will be appreciated by those of ordinary skill in the art.

Figure 4:
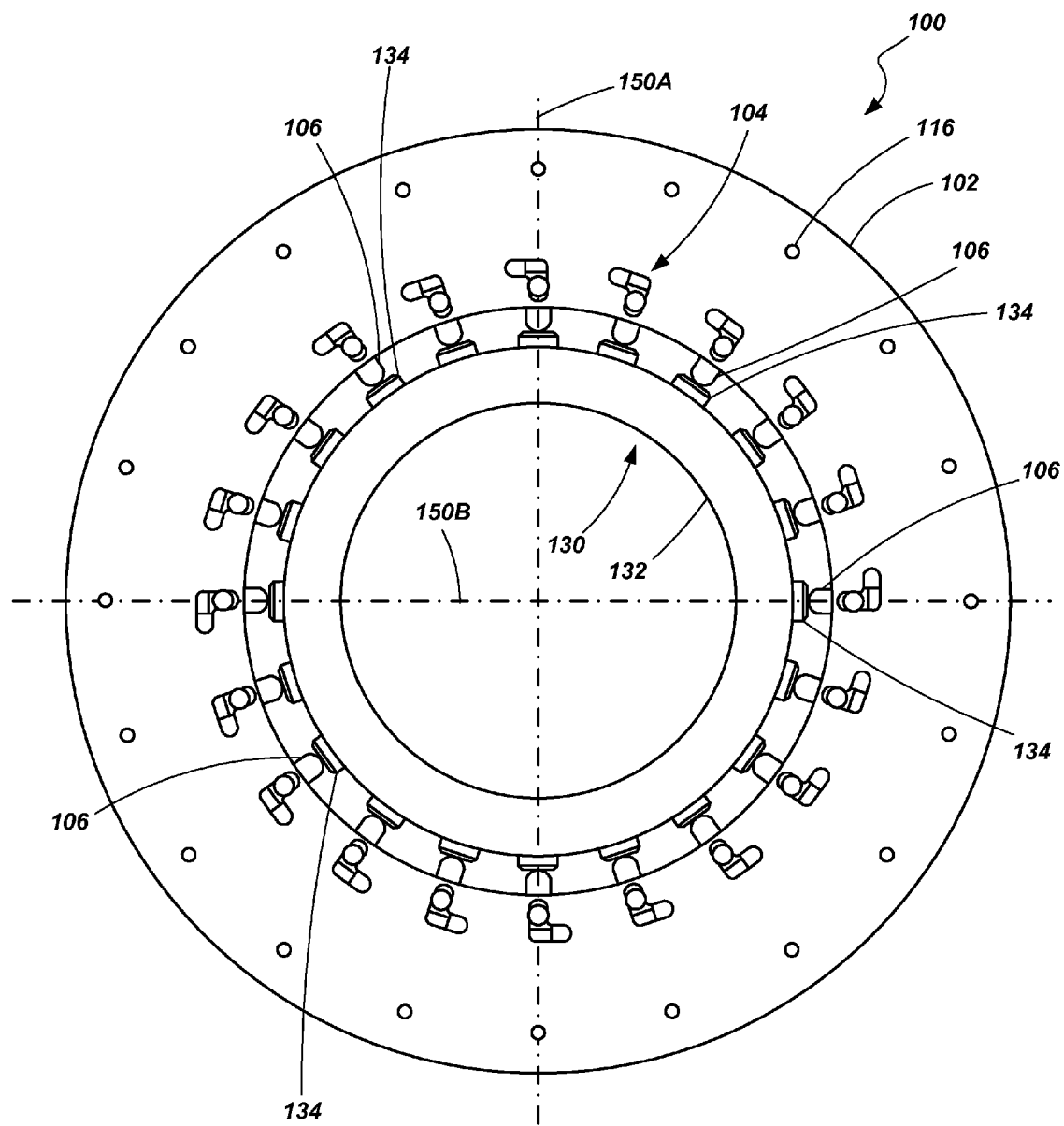
FIG. 4 is a top view of an apparatus engaged with a radial bearing according to an embodiment of the present invention.
Figure 5:
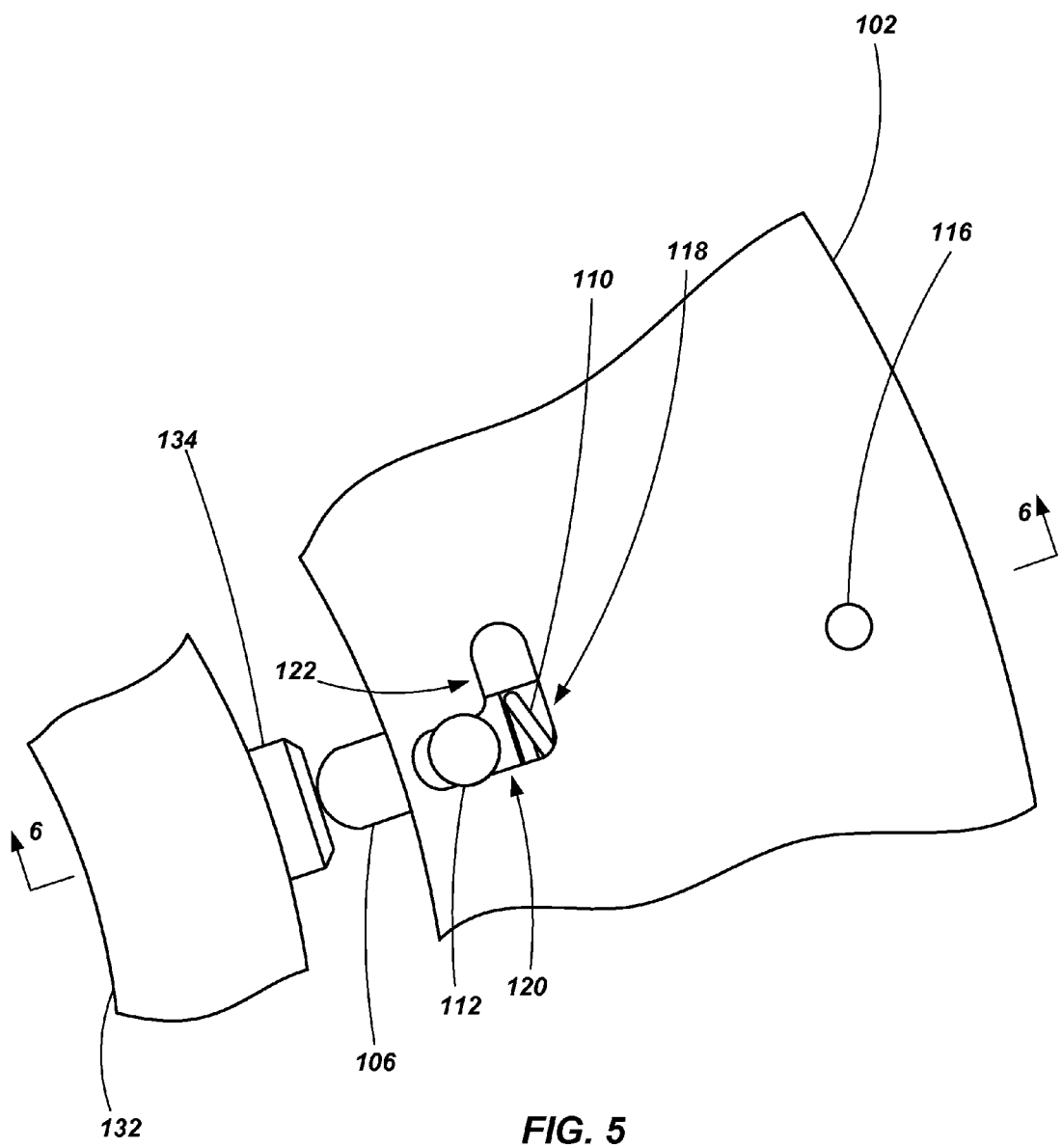
FIG. 5 is an enlarged detail view of a portion of the apparatus and bearing shown in FIG. 4.
Figure 6:
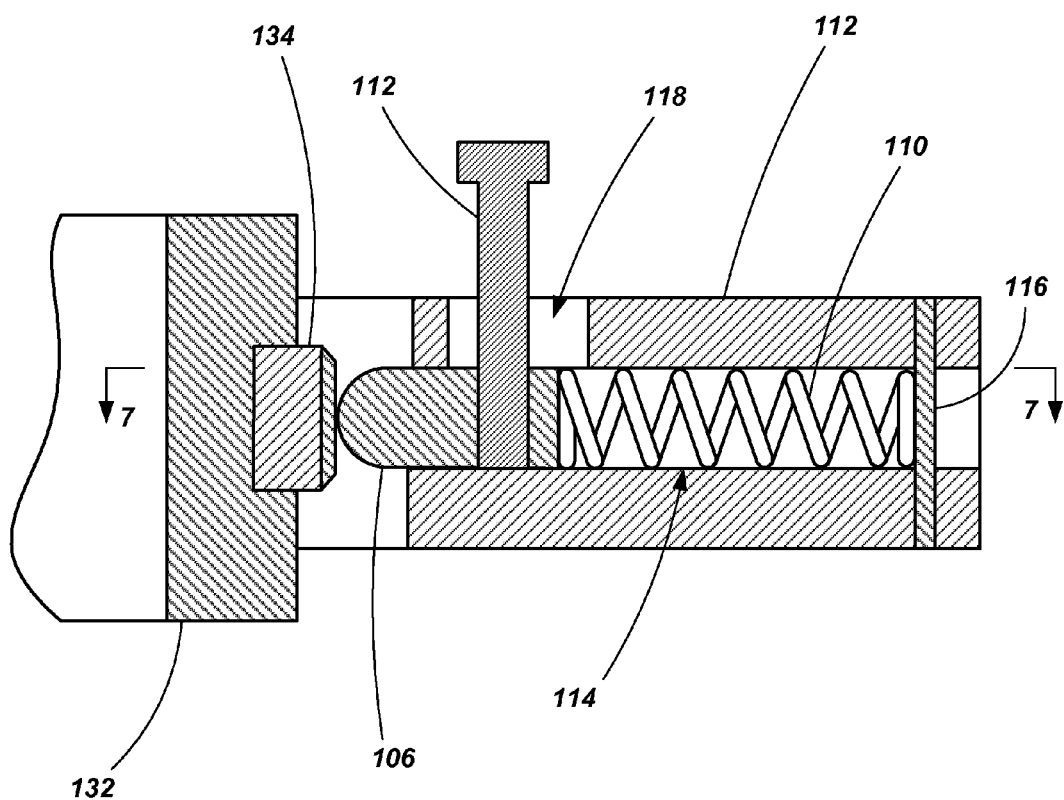
FIG. 6 is a partial cross-sectional view has taken along line "6-6" in FIG. 5.
Figure 7:
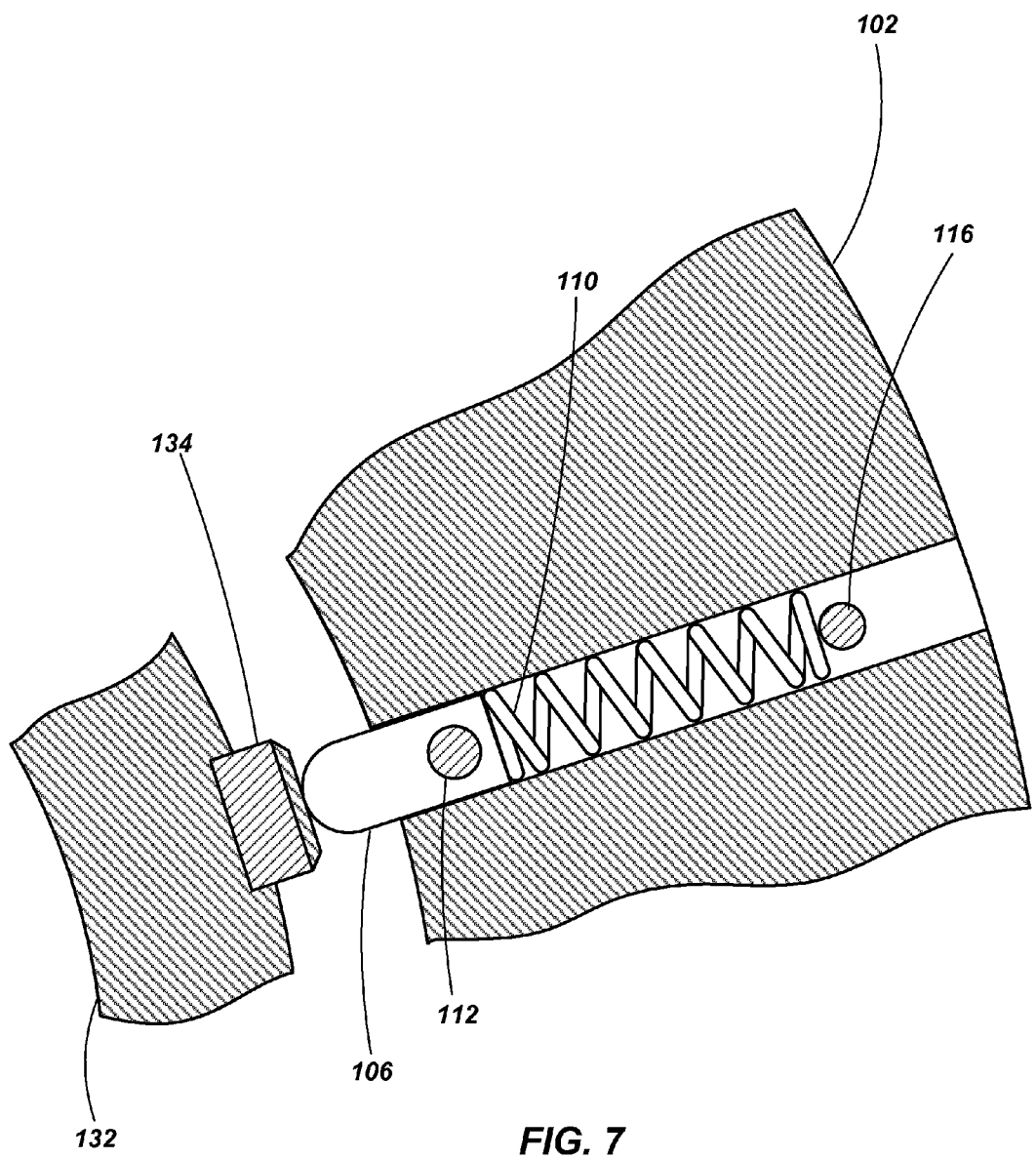
FIG. 7 is a partial cross-sectional view has taken along line "7-7" in FIG. 6.

Referring now to FIG. 4, a bearing assembly 130 is positioned within the center opening of the fixture 100 such that the fixture 100 substantially circumscribes the bearing assembly 130. FIGS. 5-7 additionally show various views of an individual pusher mechanism 104 with a bearing assembly 130 positioned adjacent thereto. The bearing assembly 130 includes a body or a bearing ring 132 having a plurality bearing elements 134 disposed in cavities or openings formed in a radially outer surface of the bearing ring 132. In one embodiment, the bearing ring 132 may be formed, for example, of a stainless steel material and the bearing elements may be formed as superabrasive elements having, for example, a substrate with a superabrasive table bonded to the substrate such as previously described.

As previously noted, during the manufacture of the bearing assembly 130, it may be desirable to braze the bearing elements 134 into the pockets formed in the bearing ring 132. In order to maintain the bearing elements 134 in a desired position and orientation within the pockets of the bearing ring 132, the pusher mechanisms 104 are actuated such that the pushrods 106 are in their deployed or extended positions and apply a force to an associated bearing element 134. It is noted that, when in a deployed condition or state, the push rods 106 need not be fully extended from the body 102. Rather, for example, when contacting an associated bearing element 134, the push rod 106 may be at a radial position that is somewhere between R1 and R2, or somewhere between R1 and the inner peripheral radial surface 108 of the body 102. This may enable a given fixture 100 to accommodate multiple sizes of bearing assemblies rather than being relegated to use with a single size of bearing assembly.

In addition to applying a force to each bearing element 134, the collective forces applied by the biasing members 110 (via the push rods 106) hold the entire bearing assembly 130 in place relative to the fixture 100. The fixture 100 and bearing assembly 130 may then be subjected to elevated temperatures provided by a furnace or other heating apparatus (such as an induction heating apparatus as described in U.S. patent application Ser. No. 12/425,304). Thus, the bearing elements 134 are maintained in a desired position and orientation, relative to the bearing ring 132, until the brazing process is complete. Subsequent the brazing process, the user may retract the pushrods 106 by displacing the actuator handle 112 as discussed above to remove the bearing assembly 130 for any subsequent manufacturing or assembly processes that may be needed or desired.

Figure 8:
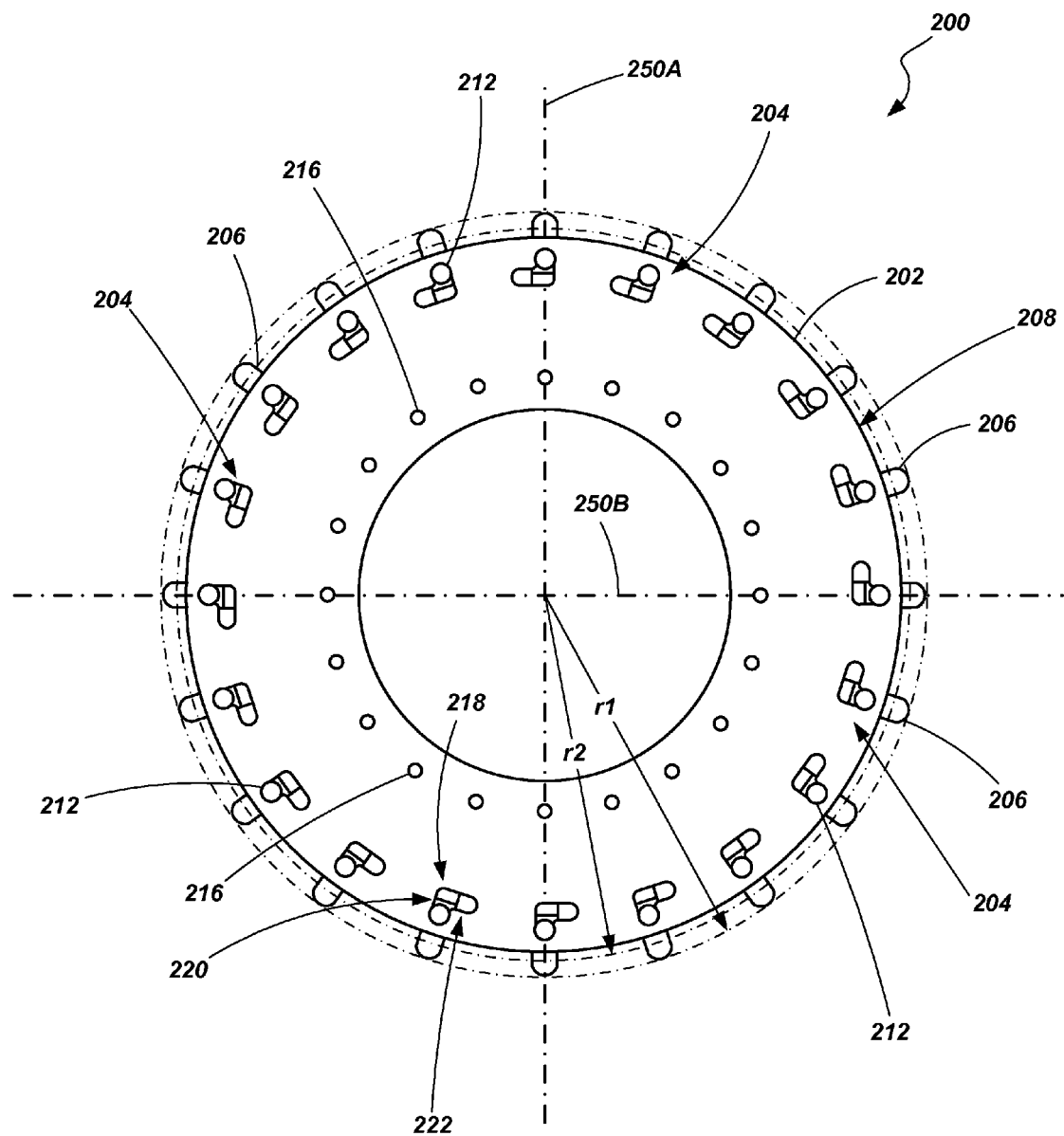
FIG. 8 is a top view of an apparatus according to another embodiment of the present invention.
Figure 9:
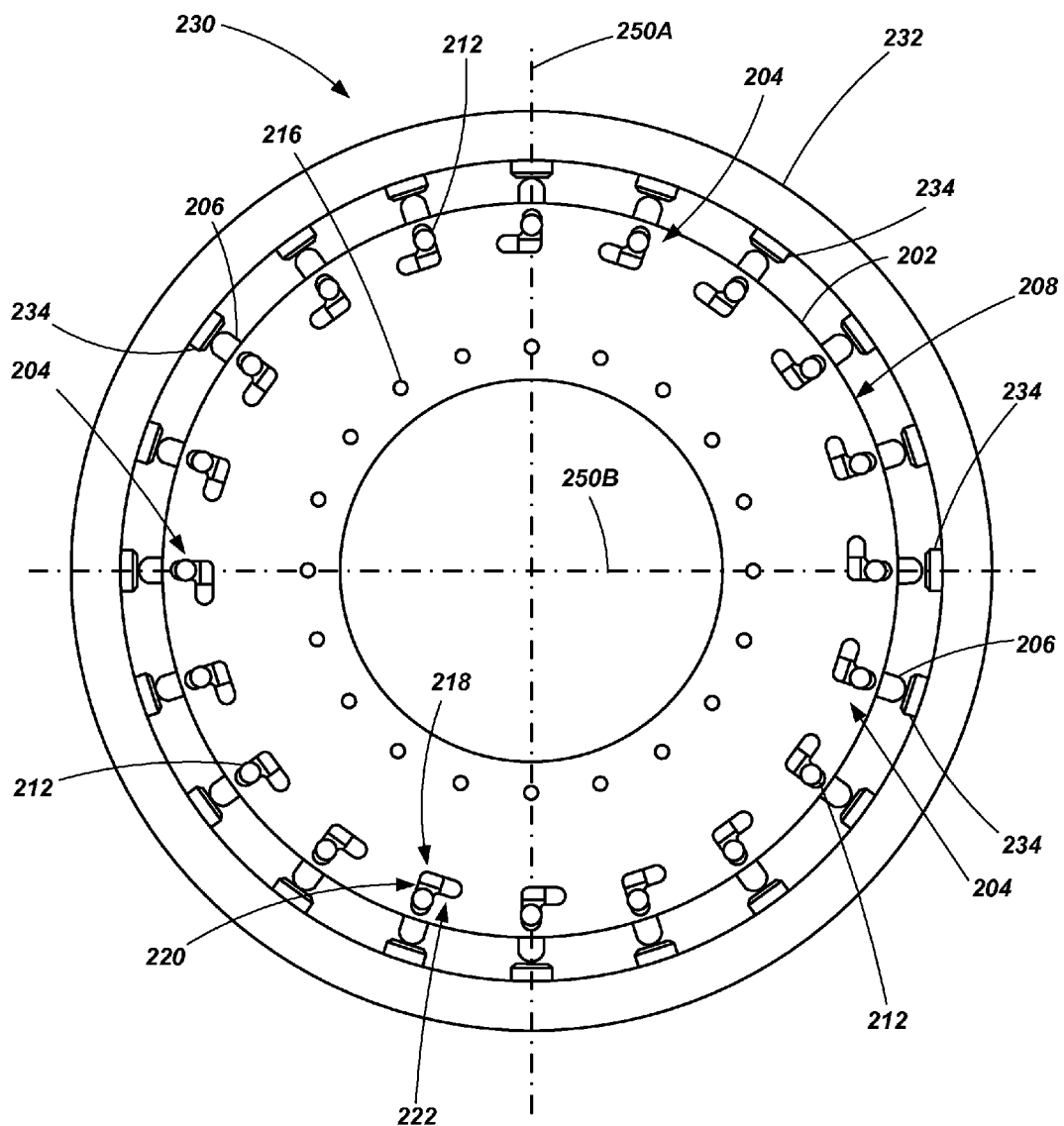
FIG. 9 is a top view of an apparatus engaged with a radial bearing according to at least one embodiment of the present invention.

Referring now to FIGS. 8 and 9, another fixture 200 is shown with another radial bearing assembly 230 (FIG. 9). The fixture 200 includes a body 202 which exhibits a substantially annular geometry. The fixture 200 includes a plurality of force-applying or pusher mechanisms 204 that are circumferentially spaced about the annular body 202. Each pusher mechanism 204 is configured to selectively engage and push against, or provide a holding force for, a bearing element 234 relative to a bearing ring 232 of a bearing assembly 230 (FIG. 9). The pusher mechanisms 204 each include a push rod 206 that extends radially outwardly from an outer radial periphery 208 of the annular body 202.

FIG. 8 shows each push rod 206 placed in an extended state, or a state for engagement with a corresponding bearing element 234. In the presently described embodiment, when the push rods 206 are in an extended state, the pushrods 206 extend radially outwardly to a first radius r1 that is slightly larger than the radius of a collective bearing surface defined by bearing elements 234 of a bearing assembly 230. While not specifically shown in FIGS. 8 and 9, the pushrods 206 may be placed in a relatively retracted state such as described above (e.g., the embodiment described with respect to FIGS. 1-3). When in the retracted state, the pushrods 206 may still extend radially outwardly from the outer radial periphery 208 of the annular body 202, but they only extend to a second radius r2, wherein r2 is smaller than r1 when measured from the center point of the fixture 200 (see the intersection of axes 250A and 250B in FIGS. 1 and 2). In other words, when in an extended state, the end surfaces of the push rods 206 are positioned further away from an associated surface (e.g., the outer radial periphery 208) of the annular body 202 than when in a retracted state. In another embodiment, the radial outermost ends of the push rods 206 may be fully retracted within the annular body 202 while in the retracted state.

In addition to the push rod 206, the pusher mechanism 204 includes a biasing member (not explicitly shown in FIGS. 8 and 9) and an actuator handle 212 coupled with the push rod 206, similar to the configuration described herein above regarding pusher mechanisms 104. The push rod 206 and biasing member 220 may be positioned in a generally radially extending channel formed in the annular body 202. A pin 216 may be positioned in the annular body 202 such that it traverses the channel and acts as a bracing or abutting member for the biasing member, keeping the radially innermost portion of the biasing member at a desired location. The handle 212 extends from the push rod 206 through an opening 218 formed in the annular body 202 that is in communication with the channel. In one embodiment, the opening 218 may be substantially L-shaped and configured so that the handle 212 may be displaced in at least two different directions. For example, the handle 212 (along with the push rod 206) may be displaced in a substantially radially direction along the length of a first leg 220 of the opening. The first leg 220 extends in substantially the same direction as the longitudinal axis of the channel and push rod 206. This displacement coincides with the displacement of the push rod 206 from an extended state to a retracted state (and vice versa) as discussed above.

In one embodiment, the opening 218 may be substantially L-shaped and configured so that the handle 212 may be displaced along at least two different axes. For example, the handle 212 (along with the push rod 206) may be displaced in a substantially radially direction along an axis that extends coincident with the length of a first leg 220 of the opening 218. It is noted that the first leg 220 extends in substantially the same direction as the channel 214. Displacement in this direction coincides with the displacement of the push rod 106 from an extended state to a retracted state (or vice versa) as discussed above.

The handle 212 may also be displaced in a second direction within a second leg 222 of the opening 218 (e.g., a generally circumferential direction), the second direction being at an angle (e.g., generally perpendicular) relative to the first direction. Displacement of the handle 212 in the second direction may include rotation of the push rod 206 about its longitudinal axis. When the handle 212 is displaced such that it is positioned within the second leg 222 of the opening 218, it holds the push rod 206 in a retracted position against the biasing force of the biasing member or other force applying member. This enables a user to maintain the push rod 206 in a retracted position while positioning a bearing assembly relative to the fixture 200. The user may then place each push rod 206 into abutting engagement with an associated bearing element by displacing the handle 212 from the second leg 222 back into the first leg 220 so that the biasing member 220 displaces the push rod 206 through the channel toward the extended position.

As with the fixture 100 describe above, the fixture 200 described with respect to FIGS. 8 and 9 may be made using various materials and manufacturing processes.

The bearing assembly 230 is positioned such that its central opening substantially circumscribes the fixture 200. The bearing assembly 230 may be formed similar to the bearing assembly 130 described above, except that bearing elements 234 are positioned in pockets formed in an radially inner peripheral surface 236, rather than in a radially outer peripheral surface of the bearing ring 232.

As previously noted, during the manufacture of the bearing assembly 230, it may be desirable to braze the bearing elements 234 into the pockets formed in the bearing ring 232. In order to maintain the bearing elements 234 in a desired position and orientation within the pockets of the bearing ring 232, the pusher mechanisms 204 are actuated such that the pushrods 206 are in their deployed or extended positions and apply a force to an associated bearing element 234. In addition to applying a force to each bearing element 234, the collective forces applied by the biasing members 220 (via the push rods 206) hold the entire bearing assembly 230 in place relative to the fixture 200. The fixture 200 and bearing assembly 230 may then be subjected to elevated temperatures provided by a furnace or other heating apparatus (such as an induction heating apparatus as described in U.S. patent application Ser. No. 12/425,304). Thus, the bearing elements 234 are maintained in a desired position and orientation, relative to the bearing ring 232, until the brazing process is complete. Subsequent the brazing process, the user may retract the pushrods 206 by displacing the actuator handle 212 as discussed above to remove the bearing assembly 230 for any subsequent manufacturing or assembly processes that may be needed or desired.

A variety of other expansion and contraction devices are also contemplated as being used in conjunction with the presently disclosed invention and the invention is not considered to be limited to the specific examples provided herein and other expanding or contracting mechanisms are contemplated as being used to apply a force to the bearing elements of a radial bearing apparatus. For example, a ring clamp may be used to bearing elements in place on an outer radial surface of a bearing ring. Other examples might include one or more collets or even a Hoberman-type structure (e.g., an expandable sphere or ring) that includes multiple linkage members to accommodate expansion and contraction of the structure wherein the structure may be either locked in place (e.g., in its expanded or its contracted state) or include a biasing member to bias it towards a desired state.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A fixture for use in brazing bearing elements to a bearing ring, the fixture comprising:
   a substantially annular body defining a continuous inner circumferential periphery and a continuous outer circumferential periphery;
   at least one force-applying mechanism associated with the annular body, the at least one force applying mechanism including:
   a push rod disposed within a channel formed in the annular body and being displaceable within the channel, wherein the push rod is configured to apply a force to an external object in a radial direction relative to the annular body.

2. The fixture of claim 1, further comprising a biasing member configured to bias the push rod in the radial direction relative to the annular body when applying the force to an external object.

3. The fixture of claim 2, wherein the at least one force-applying mechanism includes a plurality of force applying mechanisms circumferentially spaced about the substantially annular body.

4. The fixture of claim 2, wherein the push rod is selectively positionable in an extended state and a retracted state.

5. The fixture of claim 4, wherein the at least one force-applying mechanism further includes a handle coupled with the push rod.

6. A fixture for use in brazing bearing elements to a bearing ring, the fixture comprising:
   a substantially annular body;
   at least one force-applying mechanism associated with the annular body, the at least one force applying mechanism including:
   a push rod disposed within a channel formed in the annular body and being displaceable within the channel, wherein the push rod is configured to apply a force to an external object in a direction relative to the annular body; and
   a handle coupled with the push rod;
   wherein the substantially annular body includes an opening that is in communication with the channel, and wherein the handle extends through the opening.

7. The fixture of claim 6, wherein the opening is substantially L-shaped having a first leg and a second leg.

8. The fixture of claim 7, wherein the handle is selectively positionable within the first leg and the second leg, and wherein the push rod is in a retracted state when the handle is positioned within the second leg.

9. The fixture of claim 8, wherein the biasing member includes a coiled spring disposed within the channel.

10. The fixture of claim 9, further comprising an abutment member coupled with the body configured to provide an abutment surface for the coiled spring.

11. The fixture of claim 10, wherein the abutment member includes a pin extending at least partially across the channel.

12. The fixture of claim 8, wherein the handle includes a bolt that is threadedly coupled with the push rod.

13. The fixture of claim 8, wherein the substantially annular body is formed of a metal or a metal alloy.

14. The fixture of claim 8, wherein the push rod is formed of a metal or a metal alloy.

15. The fixture of claim 8, wherein the push rod extends from a radially inner peripheral surface of the annular body when in the deployed state.

16. The fixture of claim 8, wherein the push rod extends from a radially outer peripheral surface of the annular body when in the deployed state.

17. The fixture of claim 8, wherein an end of the push rod is configured for contact with a bearing element, and wherein the end of the push rod is positioned further from a surface of the body when in the deployed stated than when in the retracted state.

18. A fixture for use in brazing bearing elements to a bearing ring, the fixture comprising:
   a substantially annular body;
   at least one force-applying mechanism associated with the annular body, the at least one force applying mechanism including:
   a push rod disposed within a channel formed in the annular body and being displaceable within the channel, wherein the push rod is configured to extend from a radially outer peripheral surface of the annular body when in a deployed state and apply a force to an external object in a radial direction relative to the annular body.

19. The fixture of claim 18, wherein the at least one force-applying mechanism includes a plurality of force applying mechanisms circumferentially spaced about the substantially annular body.

20. The fixture of claim 19, wherein the push rod is selectively positionable in an extended state and a retracted state.

21. The fixture of claim 20, wherein the at least one force-applying mechanism further includes a handle coupled with the push rod.

* * * * *